Oct. 31, 1939.　　　A. BEURDELEY　　　2,178,332
SHOCK ABSORBER FOR VEHICLES
Filed Aug. 4, 1937　　　2 Sheets-Sheet 1
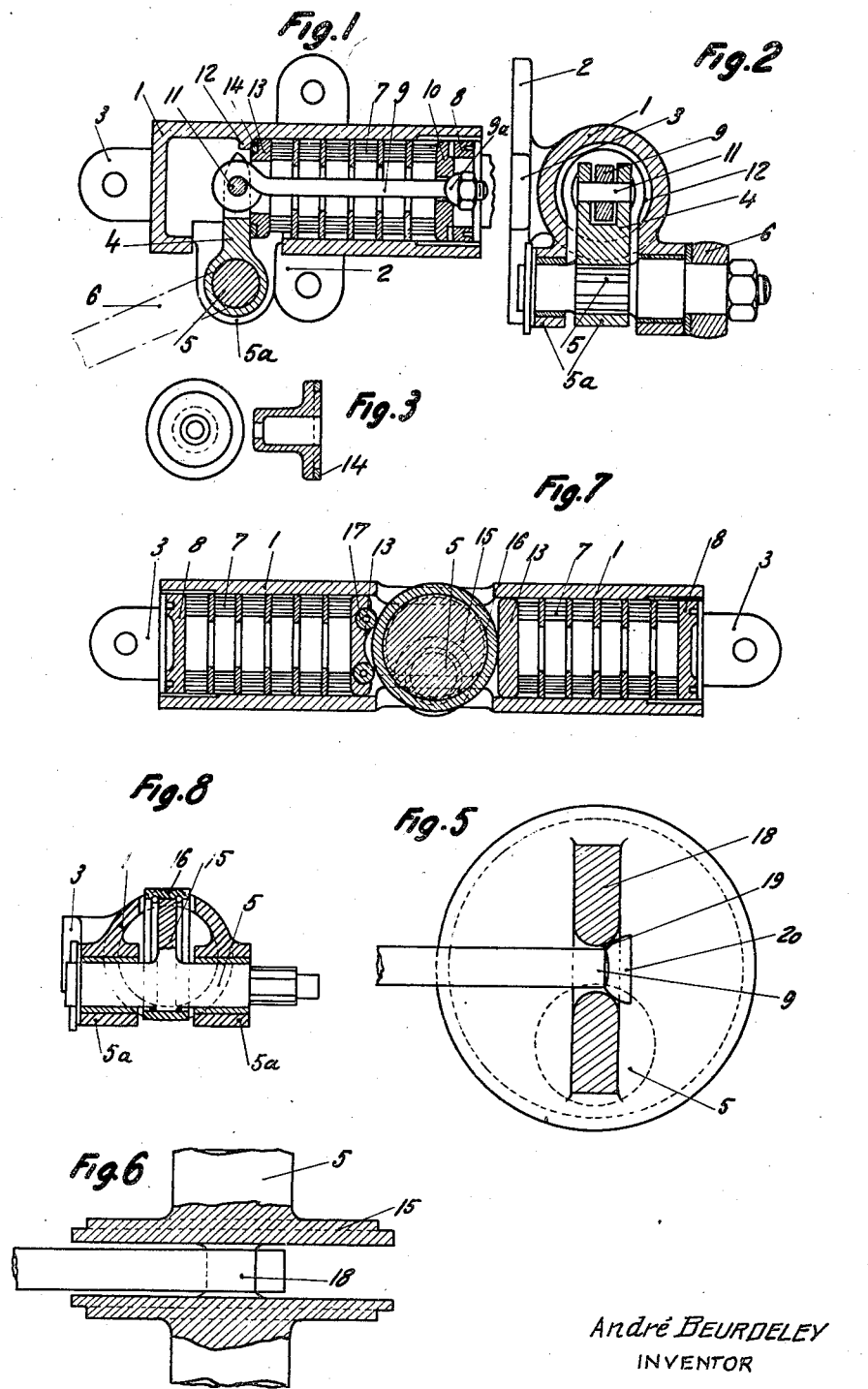
André BEURDELEY
INVENTOR
By: Haseltine, Lake & Co.
ATTORNEYS Oct. 31, 1939.   A. BEURDELEY   2,178,332
SHOCK ABSORBER FOR VEHICLES
Filed Aug. 4, 1937    2 Sheets-Sheet 2

André BEURDELEY
INVENTOR

By: Haseltine Lake & Co.
ATTORNEYS

Patented Oct. 31, 1939

2,178,332

UNITED STATES PATENT OFFICE 2,178,332

SHOCK ABSORBER FOR VEHICLES

André Beurdeley, Paris, France

Application August 4, 1937, Serial No. 157,296
In France August 13, 1936

11 Claims. (Cl. 267—21)

This invention relates to shock absorbers for vehicles, meaning thereby devices adapted to restrain the deflections of vehicle suspension springs under the action of sudden shocks or instantaneous loads, in order to prevent, or at least to impede, the establishment of oscillatory motion in the suspension system when the action of the shocks or instantaneous loads ceases, and to hasten the return of said system to a condition of stability.

The main purpose of my invention is to simplify the construction and to reduce the cost of shock absorbers or oscillation damping devices of the type described.

The principal object of my invention is to provide a type of shock absorber applicable to all varieties of vehicles, for example to automotive vehicles, which makes use of the peculiar physical properties of rubber to absorb the energy suddenly imparted to the vehicle by shocks or sudden loads resulting from obstacles or irregularities in the road bed, to dissipate as heat a large fraction of said energy, and to return the remainder at a sufficiently low rate to preclude, or at least to impede, the establishment of oscillatory motion in the suspension system.

Another object is to provide a shock absorber of the type described, in which any deflection of the suspension springs from a given neutral position causes the distortion or compression, meaning thereby a reduction in at the most two dimensions of elastic cushioning means comprising at least one block of rubber, and preferably several such blocks separated by metallic washers.

A further object is to provide a shock absorber of the type described, in which pressure is applied to one or the other end of said rubber cushioning means, depending on the direction of the deflection of the vehicle springs with respect to a given neutral position.

A still further object is to provide a shock absorber of the type described comprising an air cushion or dash pot purporting to avoid internal shocks or noises when the pressure suddenly shifts from one end to the other of said rubber cushioning means, on sudden reversals of the deflection of the vehicle springs with respect to a given neutral position.

A still further object is to provide a shock absorber of the type described in which pressure is applied to rubber cushioning means through the medium of an eccentric connected to a wheel axle.

A still further object is to provide a shock absorber of the type described comprising two distinct rubber cushions, one of which is compressed when the vehicle springs are deflected in one direction from the neutral position, the other rubber cushion being compressed when the springs are deflected in the opposite direction, and in which the pressure is applied to said rubber cushions through the medium of an eccentric connected to a wheel axle.

A still further object is to provide a shock absorber of the type described comprising two distinct rubber cushions as above, and in which the pressure is applied to said rubber cushions through the medium of a cam of suitable contour.

Further objects and advantages of my invention will appear to one skilled in the art from the following description, with reference to the accompanying drawings, it being understood, however, that said description and drawings are given mainly by way of illustration, and should not be construed as limiting the invention short of the fullest scope of the appended claims.

In these drawings:

Figs. 1 and 2 are respectively longitudinal and transversal cross-sections of one embodiment of the invention, in which the rubber cushioning means consists of one group of rubber pads.

Fig. 3 is a variant in one of the end plates shown in Fig. 1.

Figs. 5 and 6 show respectively in longitudinal and transversal cross-section another form of the pressure applying eccentric adapted to use in the embodiment illustrated in Figs. 1 and 2.

Fig. 7 shows in longitudinal cross-section a second embodiment of my invention, in which the cushioning means consist of two groups of rubber pads, pressure being applied to the same by means of an eccentric.

Fig. 8 is a transversal cross-section through the center of the pressure-applying eccentric in the variant illustrated in Fig. 7.

Figure 4:
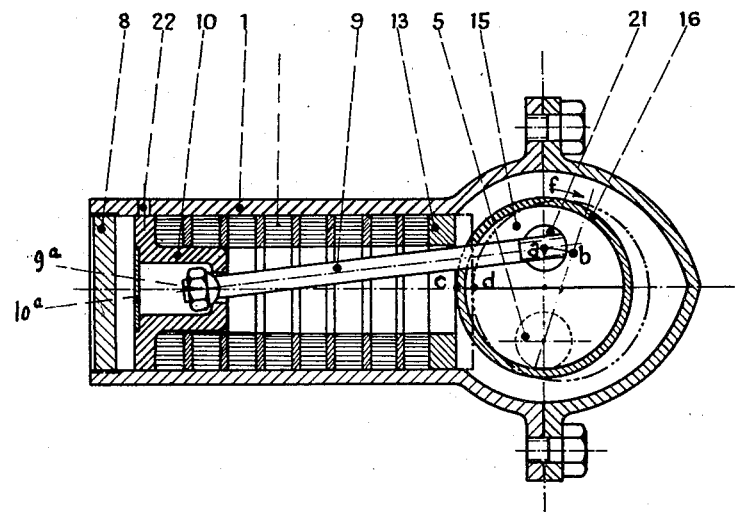
Fig. 4 is a variant of the embodiment illustrated in Figs. 1 and 2, in which pressure is applied to the rubber cushion by means of an eccentric, and a dash pot is incorporated in the shock absorber.

The two principal conditions which must be satisfied by a good shock absorber are the following:

First, it must be capable of absorbing instantaneously the energy imparted to the wheels of the vehicle by obstacles or irregularities in the road bed, of dissipating an important fraction of the energy thus absorbed as heat, and of returning the remainder of said energy to the vehicle body at a sufficiently low rate to preclude, or at least to impede, the establishment of oscillations in the suspension system.

Secondly, its resistance to compression should increase at a materially higher rate than the deflections of the suspension springs.

Now it is known that rubber, as an imperfectly elastic material, fulfils these conditions more closely than any other material. Its curve of resistance to compression—meaning thereby, as in the case of compression of a helical spring, a distortion tending to reduce at the most two linear dimensions of a mass of said material, as opposed to reduction in volume, since rubber is distortable, but not volumetrically compressible—plotted against percentages of distortion, is substantially an equilateral hyperbola with vertical and horizontal asymptotes. Furthermore, when the compression load is suddenly removed, much of the energy stored during the period of compression has been dissipated as heat, and, as a result of this phenomenon, the rubber expands back to its initial shape and dimensions relatively slowly, and does not oscillate about said dimensions and shape. It is therefore well adapted to use as a shock-absorbing material.

Rubber has the further advantages of being practically immune against rupture from overstrain or other damage, even under very large loads and is indifferent to temperature changes within the range of operating temperatures in shock absorbers.

My invention consists essentially in a shock absorber for vehicles in which suitable rubber cushioning means are provided for reinforcing the vehicle springs in such a manner as to add the compressive resistance of the rubber to that of the spring. In view of the hyperbolic compression curve peculiar to rubber, the result is that, for small deflections of the vehicle spring, the latter is practically free, since the rubber opposes little resistance to slight distortion. Therefore the flexibility and riding qualities of the suspension remain unimpaired. On the contrary, on sudden application of heavy loads, the rubber absorbs most of the energy imparted to the wheel, dissipates much of it as heat, and returns the balance sufficiently slowly to avoid the familiar "bounce" so common in rapidly moving vehicles.

My improved shock absorber may be combined with all varieties of vehicle suspension springs, including flat, helical and torsional springs.

In the embodiment of my invention illustrated in Figs. 1 and 2, 1 is a casing which I prefer to make of cylindrical shape, provided with suitable means of fixation such as flanges 2 and 3, through the medium of which said casing may be bolted to one of the relatively movable members of the suspension system, meaning thereby the vehicle chassis and the wheel axle, or their equivalents or parts connected with the same. I prefer to bolt the casing 1 to the vehicle chassis, for example at a point above a wheel axle. 4 is a pressure-applying member movable with respect to said casing and provided with an operative connection adapted to transmit thereto any motion of the wheel axle relative to the vehicle chassis. In this embodiment, said pressure-applying member is a rocker-arm 4 keyed or otherwise rigidly mounted on a pin 5 rotatable within suitable bearings 5a which may conveniently be cast integral with said casing 1.

When the shock absorber is to be mounted on a vehicle equipped with elliptical or helical suspension springs, the operative connection between the pressure-applying member 4 and a wheel axle consists of a lever 6 keyed to or otherwise rigidly mounted on said pin 5, and of a link member, not shown in the figures, which connects the free end of lever 6 to the wheel axle. In this manner, any relative motion of the wheel axle with respect to the vehicle chassis causes angular displacement of the rocker arm 4 on one side or the other of a given neutral position.

Within the casing 1, I locate the rubber cushioning and energy-storing means 7. I usually prefer to form said cushioning means of a plurality of rubber pads of circular cross-section slightly smaller in diameter than the casing 1, and I separate said rubber pads from each other by means of metallic washers of slightly larger diameter, fitting snugly though slidingly into the casing 1, the purpose of said washers being to facilitate the axial motion of the rubber pads 7. Said rubber pads and separating washers are preferably provided with a central hole, giving them an annular cross-section, for the purpose exposed below.

The rubber pads composing the cushioning means 7 are enclosed between two metallic end plates 10 and 13, which bear against and co-act with two abutment members 8 and 12, said abutment members being integral with the casing 1 and thus adapted to take up the axial thrusts of the rubber cushion and transmit said thrusts to the casing 1 and thence to the vehicle chassis. One of said abutment members 12 may conveniently be a collar cast integrally inside the casing 1, and of an inner diameter substantially smaller than the outer diameter of the end plate 13. The other of said abutment members 8 I prefer to make axially adjustable, in order to allow the initial compressive strain imposed upon the rubber cushion to be adjusted to a suitable value. To this end, I provide a threaded portion in the end of the casing 1, and a corresponding screw-thread on the circumference of the abutment collar 8, so that said collar may be set in any desired axial position.

The rocker arm 4 is located and shaped so that in the neutral position of the vehicle springs, said rocker arm rests with its free end against the end plate 13 of the rubber cushion. Hence any motion of the wheel axle relative to the vehicle chassis which displaces said rocker arm towards the right in Fig. 1 will compress said rubber cushion between said rocker arm 4 and said abutment ring 8.

On the other hand, the rocker arm 4 is articulated at 11 to a link 9 which passes through the center of the rubber cushion and its intermediate washers and end plates. Said link 9 is provided at its other end with an adjustable stop or abutment member 9a which may be, for example, a threaded nut engaging a threaded portion of the link 9, said nut preferably comprising a spherical surface bearing on the central hole of the end plate 10.

It is evident on inspection that any motion of the wheel axle resulting in the displacement of the rocker arm 4 towards the left in Fig. 1 will be transmitted by link 9 and abutment member 9a to the end plate 10 and will thus compress the rubber cushion 7 between said end plate 10 and the fixed abutment ring 12, which abutment ring 12 will transmit the thrust of the rubber cushion to the vehicle chassis.

It is seen that any motion of the wheel axle with respect to the vehicle chassis, whether it tends to compress or to release the vehicle springs, has the effect of compressing the rubber cushion 7, either from one end or from the other.

When the rocker arm 4 moves from one position and is deflected in a given direction with respect to its neutral position to a second position in the opposite direction, the compressive force acting upon the rubber cushion 7 shifts suddenly from one end to the other of said cushion 7, as the rocker arm 4 passes its neutral axis. For example, when said rocker arm 4 is deflected to the right in Fig. 1, the pressure is applied to the left end plate 13, and the right end plate 10 is pressed against the abutment ring 8. Now as the rocker arm 4 swings past its neutral point to take a position deflected to the left, the compressive force suddenly shifts to the right end plate 10, while the left end plate 13 is pressed against the abutment ring 12.

These sudden changes in the direction and point of application of the compressive pressure are apt to cause appreciable impacts, both between the end plate 10 and the abutment ring 8, and between the end plate 13 and the abutment ring 12. In order to attenuate or muffle as much as possible any noise resulting from said impacts which might be audible from the exterior, I provide the end plates 10 and 13 with damping rings 14 which may be of soft aluminium, of fibre or of rubber, and which prevent a rigid metal to metal contact between said end plates 10 and 13 and the abutment rings 8 and 12.

Fig. 3 shows a modified form of the end plate 10, which is dished in order to accommodate the abutment 9a in a manner to prevent the tip of the link 9 from projecting out of the casing 1 when the rocker arm 4 is deflected to the right.

A variant of the embodiment shown in Figs. 1 and 2 is illustrated in Fig. 4, the purpose of said variant being to prevent the above-mentioned impacts between the end plates 10 and 13 and the corresponding abutment rings 8 and 12.

In this variant, the rocker arm 4 is replaced by an eccentric 15 keyed to a rotatable shaft or pin 5 held in bearings 5a integral with the casing 1. Upon said pin 5 is mounted the lever 6 not shown in the figure but described in connection with the construction shown in Fig. 1. Said eccentric 15 is provided with an eccentric collar or strap 16, which bears against and rolls upon the end plate 13. The connecting link 9 is pivoted to said eccentric 15 at a point a located beyond the center of the eccentric with respect to the center of rotation 5; and said connecting link 9 passes through the center of the rubber pads 7 and the end plates 10 and 13, and comprises at its other end an adjustable abutment member 9a, adapted to bear on the end plate 10.

This variant differs from the embodiment shown in Fig. 1 first, in that the end plate 13 remains in continuous contact with the eccentric collar 16; and secondly, in that an air cushion forming a dash pot is interposed between the end plate 10 and the abutment member 8. To this end, said abutment member 8 consists of a metallic disk screw-threaded on its circumference to engage a threaded portion of the inner surface of casing 1. Furthermore, end plate 10 is machined to an airtight sliding fit within cylinder 1, thus forming a piston co-acting with said cylinder 1. I prefer to give said end plate 10 a dished shape, as in Fig. 3, of sufficient depth to preclude all possibility of the tip of the link 9 projecting out of its central cavity; and I close in said cavity by means of an air-tight disk 10a. In this manner, the end plate 10 forms a piston and encloses a suitable volume of air in the clearance space. Finally, in order to compensate for leakage of air during the periods of high compression, I provide an air intake orifice at 22 which is uncovered by the end plate 10 whenever the eccentric 15 is displaced to the right of its neutral position.

The link 9 may be connected to the eccentric 15 in many ways. In the embodiment illustrated in Fig. 4, I make the eccentric of sufficient thickness to allow a deep groove to be milled therein in a plane perpendicular to the axis and half way between its faces, said groove being of sufficient width axially to accommodate said link 9 with a suitable clearance on both sides. I provide a crank pin 21 rotatably mounted in the two cheeks of said groove, said crank pin 21 being drilled and tapped, while said connecting link 9 is threaded at the end to engage said tapped hole.

The initial compression imposed upon the rubber cushion 7 may be adjusted by screwing or unscrewing the nut 9a on the link 9.

The operation of the device is as follows: Let it be supposed that, when a load is applied to the vehicle springs, the eccentric 15 is deflected towards the right in Fig. 4. The point of contact c between the end plate 13 and the eccentric collar 16 is displaced to the right by an amount c—d equal to the throw of the eccentric, while the end plate 10, under the pull of the link 9, is displaced by an amount a—b greater than the throw of the eccentric. The rubber cushion 7 will therefore be compressed by an amount equal to the difference between a—b and c—d, and will store energy. When the load is suddenly removed from the vehicle springs and the latter tend to swing back past their neutral position, the eccentric moves back past its own neutral point to take a position to the left of said neutral point. In the course of this motion, the eccentric ring 16 forces the end plate 13 towards the left, and the end plate 10, under the pressure of the rubber cushion, also moves towards the left until the air pressure in the dash pot is sufficient to balance the thrust of the rubber cushion 7. Then the end plate 10 remains almost stationary, while end plate 13 continues to move towards the left under the action of the eccentric 15. The abutment 9a then loses contact with the end plate 10, and from that moment on, the displacement of the eccentric towards the left acts to compress the rubber cushion, thus storing energy therein, as in the former case.

Figs. 5 and 6 illustrate another means of attaching the link 9 to the eccentric 15. In this design, I provide twin eccentrics mounted on the same shaft 5 and joined together by a web 18 which may conveniently be cast integrally with said eccentrics. In said web 18, I provide an orifice 19 through which passes the link 9, which may be upset at the end to form a mushroom abutment 20, or threaded so as to accommodate a nut. The result is the same.

The embodiment of my invention illustrated in Fig. 7 is designed to completely eliminate all possibility of impact between the end plates and the abutment members. I achieve this result by providing twin rubber cushions between which I place the pressure-applying member, which may conveniently be an eccentric.

In Fig. 7, 1 is a casing, preferably of cylindrical shape and materially longer than in the preceding embodiment, and provided with means of fixation at 3. In the central portion of said casing, I locate an eccentric 15 provided with an eccentric collar or strap 16, and keyed to a rotatable shaft 5, upon which shaft is also rigidly mounted, as in the preceding embodiment, a lever 6 not shown in Fig. 7, said lever 6 being connected by means of a rigid link to the wheel axle. Within said casing 1 and symmetrically on either side of the eccentric 15, I dispose twin rubber cushions 7, preferably comprising, as above, a plurality of rubber pads separated by metallic washers. I further provide at the ends of casing 1 threaded portions in which are screwed threaded disks 8 forming adjustable abutments which receive the thrust of the rubber cushions 7. At the inner ends of said rubber cushions 7, I provide metallic end plates 13 which bear against, and on either side of, the eccentric collar 16.

It is to be noted that, when the eccentric moves to one side or the other of its neutral position, the thrust of said eccentric is transmitted through the collar 16 to the end plate 13 under variable angles; and furthermore, that equal angles of displacement of the eccentric around its center of rotation subtend unequal arcs of the eccentric collar 16. Therefore when the eccentric moves to the right or to the left, the collar 16 may roll without slip on one of the end plates 13, but will inevitably have to slip on the second end plate.

In order to correct this defect and to reduce to a minimum the frictional forces tending to impede the motion of the eccentric, I provide, mounted on one of the end plates 13, a roller or ball bearing 17 adapted to receive and to center the thrust of the eccentric collar 16. In this manner, I obtain perfect rolling motion without slip between the eccentric collar 16 and both of the end plates 13.

The operation of the embodiment illustrated in Fig. 7 is simpler than that of the embodiment shown in Figs. 1 and 2, or of the variant thereto shown in Fig. 4. When the eccentric is displaced from its neutral position, it depresses the rubber cushion on the side towards which it is displaced, and no internal shocks are possible, provided the position of the abutments 8 has been adjusted so as to subject the rubber cushions to the necessary initial strain.

Figure 9:
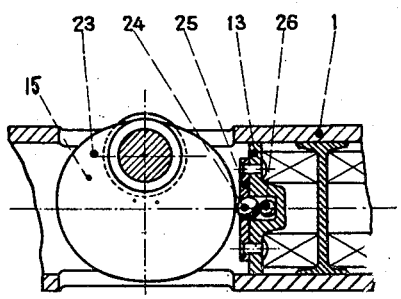
Fig. 9 shows a variant of the pressure-applying member in the embodiment illustrated in Figs. 4 and 7.

Fig. 9 illustrates a variant to the pressure-applying member used in the embodiment of Fig. 7. According to said variant, the eccentric 15 and its collar 16 are replaced by a cam 23 of suitable contour. Said cam may have any contour adapted to produce relative motion according to any desired law between the shaft 5 and the end plates 13 of the rubber cushions 7. In Fig. 9, I have shown a cam part of the circumference of which is formed by symmetrical involute curves. The advantage of the involute contour lies, first, in that the angular displacement of the cam is a linear function of the distortion of the rubber cushions; and secondly, that the tangent to the cam surface at the point of contact with the end plate 13 is perpendicular to the centerline of the casing 1. Therefore the thrust of the cam against the end plates is always exerted along said centerline, and has no oblique components.

When the pressure-applying member is a cam, as in the embodiment shown in Fig. 9, it is advisable to provide ball or roller bearings in both end plates 13, for the purpose of avoiding excessive friction between the cam surface and said end plates. In the design illustrated in Fig. 9, said ball bearings comprise a plurality of balls. For example, one of said balls, 24, is in contact with the surface of the cam 23, while another, 26, serves to facilitate the rolling of the first ball. I enclose the bearing in a recess in the end plates 13 by means of a small cover plate 25 provided with an orifice to allow the ball 24 to project therethrough to a sufficient extent to cause it to bear against the surface of the cam 23.

The two embodiments of my invention and the variants thereof illustrated respectively in Figs. 1, 2 and 4, and in Figs. 7, 8 and 9, have been described as fitted for use in combination with elliptical or helical vehicle suspension springs. When the invention is to be associated with torsional springs, and more particularly with the straight steel bar torsional type, the operative connection between the pressure-applying member and the wheel axle is reduced to a direct end-to-end connection between said torsional bar and said pin 5, for example by means of a suitable flanged coupling; or the pin 5 may even be formed by the tip of the spring itself.

I wish it to be understood that I do not desire to be limited to the exact details of construction shown and described, for obvious modifications thereto will occur to those skilled in the art. My invention covers all variants and modifications of said details of construction.

What I claim is:

1. A shock absorber for vehicles comprising, in combination, a stationary member fixed to one vehicle suspension member, a plurality of pressure-applying members movable relatively to said stationary member, an eccentric pivoted to said stationary member and associated with an eccentric collar which is in contact with at least one of said pressure-applying members, an operative connection between said eccentric and a second vehicle suspension member adapted to cause angular displacement of said eccentric from a given neutral position, and rubber cushioning means bearing against said pressure-applying members and adapted to oppose relative motion in at least two directions between said stationary and said pressure-applying members.

2. A shock absorber for vehicles comprising, in combination, a stationary member fixed to the vehicle chassis, a plurality of pressure-applying members movable relatively to said stationary member, an eccentric pivoted to said stationary member and associated with an eccentric collar which is in contact with one of said pressure-applying members, an operative connection between said eccentric and an axle of a vehicle wheel adapted to cause angular displacement of said eccentric from a given neutral position, and rubber cushioning means interposed between said pressure-applying members and adapted to oppose relative motion between said pressure-applying members.

3. A shock absorber for vehicles comprising, in combination, a stationary member fixed to the vehicle chassis, a plurality of pressure-applying members movable relatively to said stationary member, an eccentric pivoted to said stationary member and associated with an eccentric collar which is in contact with at least one of said pressure-applying members, an operative connection between said eccentric and an axle of a vehicle wheel adapted to cause angular displacement of said eccentric from a given neutral position, and rubber cushioning means bearing against said pressure-applying members and adapted to oppose relative motion in at least two directions between said stationary and said pressure-applying members.

4. A shock absorber for vehicles comprising, in combination, a cylindrical casing, means for rigidly attaching said casing to the vehicle chass, a pressure-applying member at least partly located within said casing and movable relatively to the same, an eccentric pivoted to said casing and associated with an eccentric collar which is in contact with said pressure-applying member, an operative connection between said eccentric and an axle of a vehicle wheel adapted to cause angular displacement of said eccentric from a given neutral position when said wheel axle moves with respect to said chassis, rubber cushioning means within said casing, in said casing two abutment members adapted to receive opposite thrusts from said rubber cushioning means and to transmit said thrusts to said casing, and means for applying pressure from said eccentric to different ends of said rubber cushioning means, depending on the direction of rotation of said eccentric with respect to its neutral position.

5. A shock absorber for vehicles comprising, in combination, a cylindrical casing, means for rigidly attaching said casing to the vehicle chassis, a pressure applying member at least partly located within said casing and movable relatively to the same, an eccentric pivoted to said casing and associated with an eccentric collar which is in contact with said pressure-applying member, an operative connection between said eccentric and an axle of a vehicle wheel adapted to cause angular displacement of said eccentric from a given neutral position when said wheel axle moves with respect to said chassis, rubber cushioning means within said casing, in said casing two abutment members adapted to receive opposite thrusts from said rubber cushioning means and to transmit said thrusts to said casing, at least one of said abutment members being axially adjustable within said casing, and means for applying pressure from said eccentric to different ends of said rubber cushioning means, depending on the direction of rotation of said eccentric with respect to its neutral position.

6. A shock absorber for vehicles comprising, in combination, a cylindrical casing, means for rigidly attaching said casing to the vehicle chassis, an eccentric pivoted to said casing and adapted to oscillate with respect to the same, an eccentric collar associated with the eccentric, an operative connection between said eccentric and a wheel axle adapted to cause angular displacement in said eccentric from a given neutral position when said wheel axle moves with respect to the vehicle chassis, within said casing rubber cushioning means provided with rigid end plates and adapted to receive pressure from said eccentric by direct contact of its collar on one end plate and through the medium of a connecting link on the other end plate, said connecting link being adapted to exert a tractive effort only on said second end plate, the point of direct contact between said collar and said first end plate of said rubber cushioning means being closer to the center of oscillation of said eccentric than the point of attachment of said connecting link, said eccentric being thus adapted to exert a differential compressive action on said rubber cushioning means when displaced in one direction from its neutral position, and a direct compressive action on the same when displaced in the opposite direction from said neutral position, in said casing an adjustable abutment member adapted to receive indirectly the thrust of said rubber cushioning means and to transmit same to said casing, and an air cushion forming dash pot interposed between one end place of said rubber cushioning means and said adjustable abutment member.

7. A shock absorber for vehicles comprising, in combination, a cylindrical casing, means for rigidly attaching said casing to the vehicle chassis, a pressure-applying eccentric pivoted to said casing and associated with an eccentric collar, an operative connection between said eccentric and a wheel axle adapted to cause angular displacement of said eccentric from a given neutral position when said wheel axle moves with respect to said vehicle chassis, in said casing rubber cushioning means, metallic end plates froming both ends of said cushioning means, the first of said end plates contacting with said eccentric collar, a connecting link pivoted to said eccentric at a point having a throw greater than that of the center of the eccentric said connecting link extending through said cushioning means and the end plates thereof, an adjustable stop on said connecting link adapted to transmit to said second end plate a tractive effort only, said second end plate being machined to a substantially air-tight sliding fit within said cylindrical casing, a threaded portion in the end of said casing, a threaded disk engaging said threaded portion and adapted to form an adjustable dash pot between itself and said air-tight end plate, and an air intake port in said casing wall adapted to supply air to said dash pot.

8. A shock absorber for vehicles comprising, in combination, a cylindrical casing, means for rigidly attaching said casing to the vehicle chassis, an eccentric associated with an eccentric collar adapted to actuate two pressure-applying members at least partly located within said casing and movable relatively to said casing, means for actuating said eccentric by the relative motion of a wheel axle with respect to said chassis, within said casing rubber cushioning means located on either side of said eccentric and interposed between said pressure-applying members and adjustable abutment members adapted to receive the thrusts of said cushioning means and to transmit the same to said casing, said pressure-applying members being adapted to compress at least part of said rubber cushioning means when displaced from a given neutral position.

9. A shock absorber for vehicles comprising, in combination, a cylindrical casing, means for rigidly attaching said casing to the vehicle chassis, an eccentric associated with an eccentric collar adapted to actuate two pressure-applying members at least partly located within said casing and movable relatively thereto, means for actuating said eccentric by the relative motion of a wheel axle with respect to said chassis, within said cylindrical casing rubber cushioning means located on either side of said eccentric and interposed between said pressure-applying members and adjustable abutment members adapted to receive the thrusts of said cushioning means and to transmit the same to said casing, said pressure-applying members being adapted to compress one fraction of said rubber cushioning means when displaced in one direction from a given neutral position, and to compress another fraction of said cushioning means when displaced in the opposite direction from said neutral position.

10. A shock absorber for vehicles comprising, in combination, a cylindrical casing, means for rigidly attaching said casing to the vehicle chassis, an eccentric associated with an eccentric collar actuating two pressure-applying members at least partly located within said casing and movable relatively thereto, means for actuating said eccentric by the relative motion of a wheel axle with respect to said chassis, within said cylindrical casing rubber cushioning means located on either side of said eccentric and interposed between said pressure-applying members and adjustable abutment members adapted to receive the thrusts of said cushioning means and to transmit the same to said casing, said pressure-applying members being adapted to compress one fraction of said rubber cushioning means when displaced in one direction from a given neutral position, and to compress another fraction of said cushioning means when displaced in the opposite direction from said neutral position, and rollers fixed on one of said pressure-applying members and interposed between this member and the eccentric collar.

11. A shock absorber for vehicles comprising, in combination, a cylindrical casing, means for rigidly attaching said casing to the vehicle chassis, an eccentric pivoted to said casing and adapted to oscillate with respect to the same, said eccentric comprising two parallel discs mounted on the same shaft and joined by a web provided with an orifice located at a distance from the center of oscillation of the eccentric greater than the throw of said eccentric, an eccentric collar associated with the eccentric, an operative connection between said eccentric and a wheel axle adapted to cause angular displacement of said eccentric from a given neutral position when said wheel axle moves with respect to the vehicle chassis, within said casing rubber cushioning means provided with rigid end plates and adapted to receive pressure from said eccentric by direct contact of its collar on one end plates and through the medium of a connecting link on the other end plate, said connecting link passing through said orifice in the eccentric web and being adapted to exert a tractive effort only on said second end plate, said eccentric being thus adapted to exert a differential compressive action on said rubber cushioning means when displaced in one direction, from its neutral position, and a direct compressive action on the same when displaced in the opposite direction from said neutral position, in said casing an adjustable abutment member adapted to receive indirectly the thrust of said rubber cushioning means and to transmit same to said casing, and an air cushion forming dash pot interposed between one end plate of said rubber cushioning means and said adjustable abutment member.

ANDRÉ BEURDELEY.